(12) United States Patent
Ding et al.

(10) Patent No.: US 10,005,202 B2
(45) Date of Patent: Jun. 26, 2018

(54) AUTOMATIC MACHINING DEVICE FOR HIGH-SPEED RAIL PANTOGRAPH CARBON CONTACT STRIP AND MACHINING METHOD THEREFOR

(71) Applicant: Zhejiang Chenlong Sawing Machine Company Limited, LiShui (CN)

(72) Inventors: Zelin Ding, LiShui (CN); Xiasheng Ding, LiShui (CN); Ping Jiang, LiShui (CN)

(73) Assignee: Zhejiang Chenlong Sawing Machine Company Limited, LiShui, Zhejiang Province (CN)

( * ) Notice: Subject to any disclaimer, the term of this patent is extended or adjusted under 35 U.S.C. 154(b) by 0 days. days.

(21) Appl. No.: 15/510,726

(22) PCT Filed: Oct. 24, 2015

(86) PCT No.: PCT/CN2015/092785
§ 371 (c)(1),
(2) Date: Mar. 13, 2017

(87) PCT Pub. No.: WO2016/173220
PCT Pub. Date: Nov. 3, 2016

(65) Prior Publication Data
US 2018/0036913 A1 Feb. 8, 2018

(30) Foreign Application Priority Data
Apr. 27, 2015 (CN) .......................... 2015 1 0203804

(51) Int. Cl.
*B28D 1/00* (2006.01)
*B28D 1/18* (2006.01)
(Continued)

(52) U.S. Cl.
CPC ................ *B28D 1/003* (2013.01); *B23C 3/12* (2013.01); *B23C 3/28* (2013.01); *B23D 55/08* (2013.01);
(Continued)

(58) Field of Classification Search
CPC . Y10T 83/0207; Y10T 83/04; Y10T 83/0524; Y10T 83/5669; Y10T 83/647;
(Continued)

(56) References Cited

U.S. PATENT DOCUMENTS 7,628,677 B1* 12/2009 Branton .................... B24B 9/06
125/19
2010/0263513 A1* 10/2010 Czeck .................... B28D 1/003
83/663
2015/0083103 A1* 3/2015 Calas .................... B28D 1/003
125/14

FOREIGN PATENT DOCUMENTS

CN 201161464 Y 12/2008
CN 103659273 A 3/2014
(Continued)

*Primary Examiner* — Phong Nguyen
(74) *Attorney, Agent, or Firm* — IPro, PLLC; Na Xu; Qian Gu (57) ABSTRACT

An automatic machining device for machining a high-speed rail pantograph carbon contact strip is sequentially provided with a milling position, a sawing position and a chamfering position, and comprises a rack, a band sawing machine, a workpiece milling device, a workpiece chamfering device, a CNC computer numerical control system and a pneumatic system. A carbon contact strip workpiece to be machined is arranged on the rack and is sequentially subjected to milling, sawing and chamfering machining; and a saw frame of the band sawing machine is also provided with a saw band upper guide servo rotating device and a saw band lower guide servo rotating device, and the saw band upper guide servo rotating device and the saw band lower guide servo rotating device and the saw band lower guide servo rotating (Continued)

device can freely, synchronously and correspondingly rotate a band saw blade within a certain range.

10 Claims, 6 Drawing Sheets

(51) Int. Cl.
    *B23D 55/08*     (2006.01)
    *B60L 5/24*     (2006.01)
    *B23C 3/12*     (2006.01)
    *B23C 3/28*     (2006.01)
    *B28D 1/08*     (2006.01)
    *B28D 7/00*     (2006.01)

(52) U.S. Cl.
    CPC .............. *B28D 1/086* (2013.01); *B28D 1/18* (2013.01); *B28D 7/005* (2013.01); *B60L 5/24* (2013.01); *B60L 2200/26* (2013.01); *B60Y 2200/30* (2013.01)

(58) Field of Classification Search
    CPC . Y10T 83/6492; Y10T 83/707; Y10T 83/727; Y10T 83/95; B28D 1/003; B28D 1/086; B28D 1/18; B28D 1/00; B28D 1/08; B28D 1/22; B28D 1/30; B28D 7/005; B28D 7/04; B23D 55/08; B23D 55/10; B60L 5/24; B60L 2200/26; B60Y 2200/30; B23C 3/12; B23C 3/28
    See application file for complete search history.

(56) References Cited

FOREIGN PATENT DOCUMENTS

| | | |
|---|---|---|
| CN | 204248939 U | 4/2015 |
| CN | 104772827 A | 7/2015 |
| CN | 204604606 U | 9/2015 |
| EP | 0516071 A2 | 12/1992 |

\* cited by examiner

AUTOMATIC MACHINING DEVICE FOR HIGH-SPEED RAIL PANTOGRAPH CARBON CONTACT STRIP AND MACHINING METHOD THEREFOR

TECHNICAL FIELD

The present invention belongs to the technical field of band sawing machines, and particularly relates to an automatic machining device for a high-speed rail pantograph carbon slide plate and a machining method thereof.

BACKGROUND

A pantograph is also referred to as a bow collector, is an electrical device for a high speed train to receive electric energy from a contact network, and is installed on a train roof. It is named because the rhombic pantograph seems like an opened bow as seen from the side. The pantograph is generally divided into a single arm pantograph and a double arm pantograph, and at present what is frequently used is the single arm pantograph. A carbon slide plate is a key component of the pantograph. When a train runs, the carbon slide plate and a train line slide plate are mainly in contact with a contact wire. Carbon slide plates used at the market at present are mainly a pure metal slide plate, a powder metallurgy slide plate, a pure carbon slide plate and a dip metal slide plate. The pure carbon slide plate becomes a slide plate special for high speed rails such as a train with the speed exceeding 200 Km per hour due to its characteristics of abrasion resistance, high conductivity, corrosion resistance and high temperature resistance and the like.

In the running process of the high speed train, the carbon slide plate needs be consumed in order to protect the contact wire. The service life of the carbon slide plate is relevant with the speed. The carbon slide plate needs to be replaced after about a trip of the Wuguang high speed rail, or else the pantograph cannot be in good contact with the wire, which leads to too long off-line time and affects the running of the high speed rail. As a result, the number of the consumed carbon slide plates is especially large. Along with subway construction in full swing in each city at home and the opening up of inter-city trains, the number of used carbon slide plates is further increased.

The carbon slide plate is composed of multi-section radians, has a length of 1.5 m and a thickness of only 40 mm, and belongs to long and narrow workpieces. Accordingly, existing carbon slide plate production is in a one-time casting forming mode at home and abroad. Since poor impurities are generated easily in the casting process to lead to waste products and four sides need to be machined due to the fact that the cast surface is poor in smooth finish, not only is the waste severe, but also the production efficiency is low. Moreover, the carbon slide plate belongs to brittle materials and it is difficult to clamp a narrow and long workpiece; particularly, the machining of a middle curve groove needs to be kept consistent with the internal radian; however, the secondary clamping during the machining has a harmful effect of dimensional accuracy.

TECHNICAL PROBLEM

Against the technical problem to be solved, the present invention provides an automatic machining device for a high-speed rail pantograph carbon slide plate and a machining method thereof. The pantograph carbon slide plate is machined by means of a sawing mode, the processes of sawing, milling and chamfering are integrated on one device, and the device automatically completes the processes of milling, sawing and chamfering after one-time clamping, thereby saving materials, and improving working efficiency. Moreover, the smooth finish of the sawed material meets the assembly requirements of the pantograph, secondary machining and clamping at the conversion machining place are omitted, the product dimensional accuracy is improved, batch production is performed, dimensional consistency is guaranteed, and production efficiency is improved.

TECHNICAL SOLUTION TO PROBLEM

Solution

The present invention is implemented in this way: an automatic machining device for a high-speed rail pantograph carbon slide plate is provided; the automatic machining device is sequentially provided with a milling station, a sawing station and a chamfering station and comprises a machine frame, a band sawing machine, a workpiece milling device, a workpiece chamfering device, a computer numerical control (CNC) system and a pneumatic system; the band sawing machine, the workpiece milling device and the workpiece chamfering device are located on the same side of the machine frame; the workpiece milling device is arranged in the front of the band sawing machine, the workpiece chamfering device is disposed at the rear of the band sawing machine, and a carbon slide plate workpiece to be machined is placed on the machine frame to be sequentially subjected to milling, sawing and chamfering machining; and the CNC system and the pneumatic system control the whole sawing band sawing machine to run normally. The band sawing machine is located on the sawing station and comprises a saw frame, a saw blade tensioning device, a main driving system, a driving pulley, a driven pulley and a band saw blade. The saw frame is located on the left side of the machine frame. The driving pulley and the driven pulley are arranged on the saw frame. The main driving system drives the driving pulley to rotate, the driving pulley drives the band saw blade to rotate along the driving pulley and the outer circle side edge of the driven pulley, and the tensioning degree of the band saw blade is adjusted through the saw blade tensioning device disposed on the side of the driven pulley. The saw frame is further provided with a saw band guiding device, and the saw band guiding device comprises a saw band upper guide servo rotating device and a saw band lower guide servo rotating device. The saw band upper guide servo rotating device is close to the side of the driven pulley, and the saw band lower guide servo rotating device is close to the side of the driving pulley. The saw band upper guide servo rotating device and the saw band lower guide servo rotating device can freely, synchronously and correspondingly rotate the band saw blade within a certain range.

Furthermore, the saw band upper guide servo rotating device and the saw band lower guide servo rotating device are structurally the same.

Furthermore, the saw band upper guide servo rotating device comprises a servo motor, a precision planetary reducer, a mounting base, a rotating shaft, a driven gear and a driving gear. The servo motor drives the precision planetary reducer; the precision planetary reducer drives the driven gear through the driving gear; and the driven gear drives the rotating shaft to rotate on the mounting base according to a designated angle. The band saw blade penetrates the axis of the rotating shaft. The rotating shaft is provided with a saw band guide block and a saw band pre-guiding shaft, and the band saw blade is driven by the saw band guide block and the saw band pre-guiding shaft to rotate according to a designated angle.

Furthermore, the saw band upper guide servo rotating device further comprises a horizontal adjustment base plate and a support. The mounting base is disposed on the horizontal adjustment base plate; the left-right horizontal position of the mounting base can be adjusted on the horizontal adjustment base plate which is arranged on the support; and the front-rear horizontal position of the mounting base can be adjusted on the support which is disposed on the saw frame.

Furthermore, the band saw blade randomly and freely rotates within a range of −90 degrees to +90 degrees around its symmetric center.

Furthermore, the machine frame is provided with a workpiece horizontal pushing servo device, a workpiece clamping pushing pneumatic device, a saw front workpiece pneumatic clamping device, a longitudinal servo moving working table, a longitudinal servo moving device, a horizontal servo moving working table and a horizontal moving servo device. The longitudinal servo moving device drives the longitudinal servo moving working table to move horizontally; the horizontal moving servo device drives the horizontal servo moving working table to move longitudinally; the horizontal moving servo device and the horizontal servo moving working table are disposed on the longitudinal servo moving working table; and the workpiece horizontal pushing servo device, the workpiece clamping pushing pneumatic device and the saw front workpiece pneumatic clamping device are arranged on the horizontal servo moving working table.

Furthermore, the workpiece milling device is located on the milling station and comprises a milling head, a milling head moving servo motor, a milling head moving base and a milling support; the milling head moving servo motor and the milling head moving base are arranged on the milling support; the milling head is arranged on the milling head moving base; the milling head moving servo motor drives the milling head to move horizontally in a left-right mode through the milling head moving base; the milling head can perform milling groove machining on the left side of the carbon slide plate, and the milling support is located on the left side of the machine frame.

Furthermore, the workpiece chamfering device is located on the chamfering station and comprises an upper chamfering motor, a lower chamfering motor, a chamfering moving motor, a chamfering moving base and a chamfering support; the chamfering moving motor and the chamfering moving base are arranged on the chamfering support; the chamfering moving motor drives the chamfering moving base to move; the upper chamfering motor and the lower chamfering motor are disposed on the chamfering moving base up and down; the chamfering moving motor drives the upper chamfering motor and the lower chamfering motor to move horizontally in a left-right mode simultaneously through the chamfering moving base; the upper chamfering motor and the lower chamfering motor simultaneously perform chamfering machining on the edge of the left side of the carbon slide plate workpiece, and the chamfering support is located on the left side of the machine frame.

The present invention further comprises a using method for performing sawing machining by means of the all CNC curve profiling sawing band sawing machine, and the method comprises the following steps:

the first step: the device is started and is in an initial state; the CNC system and the pneumatic system of the device are started; the longitudinal servo moving working table, the horizontal servo moving working table and the workpiece horizontal pushing servo device of the device return to an origin; and the workpiece clamping pushing pneumatic device and the saw front workpiece pneumatic clamping device are loosened;

the second step: the carbon slide plate workpiece is fed and clamped; a blank of the carbon slide plate workpiece to be sawed is manually lifted to the horizontal servo moving working table, the workpiece clamping pushing pneumatic device clamps the blank, the workpiece horizontal pushing servo device is started to push the blank out to an origin position to be sawed, and the saw front workpiece pneumatic clamping device clamps the blank;

the third step: the milling station works; a CAD drawing of the carbon slide plate workpiece to be sawed is input into the CNC system to be subjected to program editing; a start button is started, the milling head moving servo motor drives the milling head to move on the milling head moving base; the longitudinal servo moving device and the horizontal moving servo device perform interpolation motion according to the input CAD drawing to move to be in place, and the milling head performs milling of a curve groove of the blank of the carbon slide plate workpiece;

the fourth step: the sawing station works; after the milling is performed, the main driving system runs and drives the band saw blade to run at a high speed through the saw blade tensioning device, and then the longitudinal servo moving device and the horizontal moving servo device move simultaneously according to the editing program of the input CAD drawing, so that the longitudinal and horizontal servo interpolation motion of the workpiece is performed; meanwhile, under the precision driving by the saw band upper guide servo rotating device and the saw band lower guide servo rotating device, the band saw blade rotates around the center of the band saw blade, so that the band saw blade is always tangent to a sawing arc, and it is guaranteed that a sawing curve is connected smoothly;

the fifth step: the chamfering station works; after the sawing, the longitudinal servo moving working table continues to move forwards; when the longitudinal servo moving working table reaches the position of the workpiece chamfering device, the device sends signals to the CNC system; driven by the chamfering moving motor, the upper chamfering motor and the lower chamfering motor move forwards along the chamfering moving base and rotates; at the same time, the longitudinal servo moving device and the horizontal moving servo device perform interpolation motion according to the input CAD drawing to move to be in place, so as to complete chamfering processes of the edges of the upper surface and the lower surface of the carbon slide plate workpiece;

the sixth step: discharging is performed after the sawing is performed; after one carbon slide plate workpiece is sawed, the longitudinal servo moving working table and the horizontal servo moving working table return to the origin, the saw front workpiece pneumatic clamping device loosens the carbon slide plate workpiece, the carbon slide plate workpiece D having been machined is taken out to prepare for the machining of a next blank; and circulation is performed in this way until the last workpiece is machined.

Furthermore, in the fifth step, the chamfering machining angle of the carbon slide plate workpiece is set by respectively adjusting the angle between the carbon slide plate workpiece and the upper chamfering motor and the angle between the carbon slide plate workpiece and the lower chamfering motor.

BENEFICIAL EFFECTS OF THE PRESENT INVENTION

Beneficial Effects

Compared with the prior art, the automatic machining device for the high-speed rail pantograph carbon slide plate and the machining method thereof are characterized in that:

1. The method is modified based on a process for producing a conventional high-speed rail pantograph carbon slide plate, the casting forming is modified to be a band sawing machine multi-radian sawing process; through a curve groove machining and chamfering process of one-time clamping, machining precision of the carbon slide plate is guaranteed, and a whole carbon block is machined into carbon slide blocks in batches, thereby saving materials, and improving the working efficiency.

2. Through a mode of speed matching of the longitudinal servo movement and horizontal servo movement of the whole carbon block, a CNC intelligent control program is adopted, interpolation motion is adopted to achieve a series of work of carbon slide plate curve groove milling, band saw blade radian sawing and curve chamfering; batch production is performed, the workpiece dimensional consistency is good, and the production efficiency is high.

3. The CNC intelligent control program specially used for carbon slide block curve groove milling, band saw blade radian sawing and curve chamfering is developed, and the connection with a computer system is performed; through the input of the CAD drawing, the work of curve groove milling, band saw blade radian sawing and curve chamfering of the carbon slide block is done directly; the working track of the carbon slide block can be displayed, operators' trouble of direct programing is reduced, the operation process is simplified, and the applied range is expanded.

OPTIMAL EMBODIMENTS OF THE PRESENT INVENTION

Optimal Execution Modes of the Present Invention

In order to make technical problems to be solved, technical solution and beneficial effects of the present invention clearer, the present invention is further described in detail below in combination with accompanying drawings and embodiments. It should be understood that the concrete embodiments described here are only used for explaining the present invention and are not used to limit the present invention.

Figure 1:
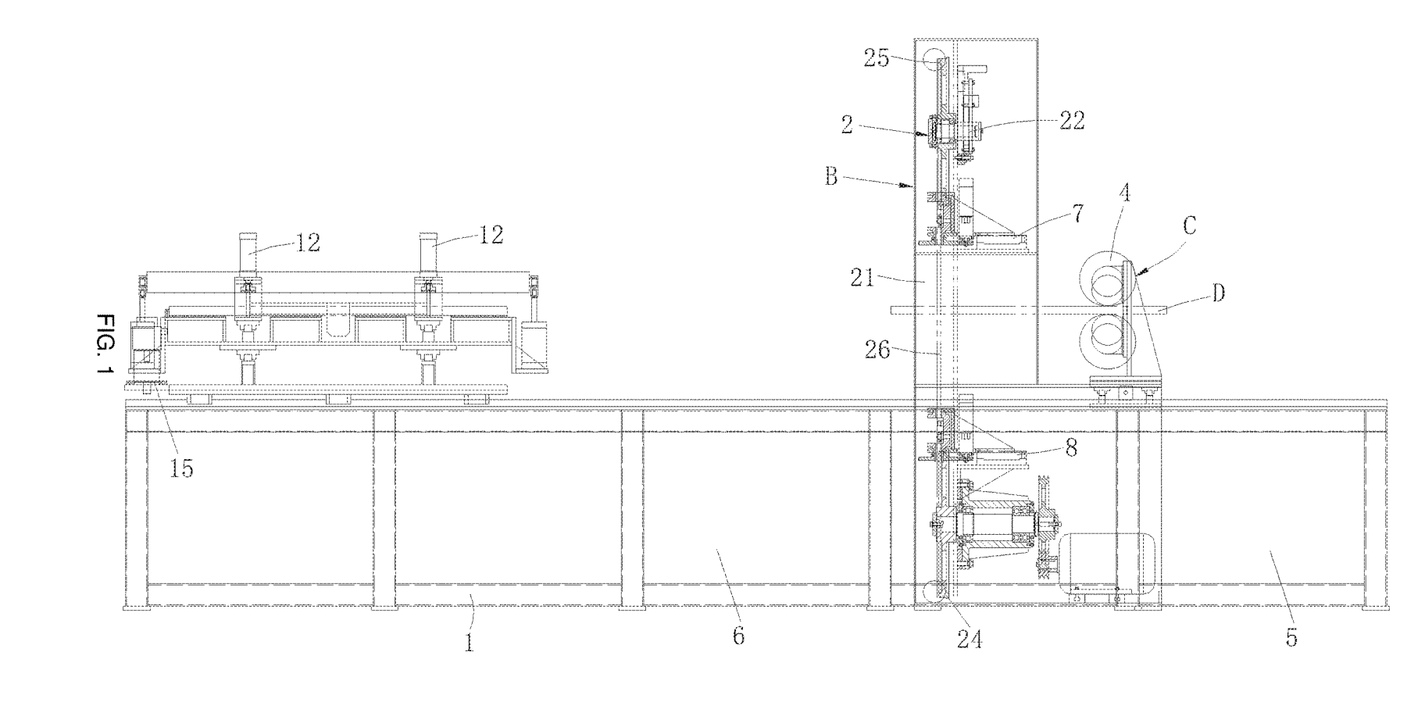
FIG. 1 is a front view (where a workpiece milling device is omitted) of a preferred embodiment of the present invention.
Figure 2:
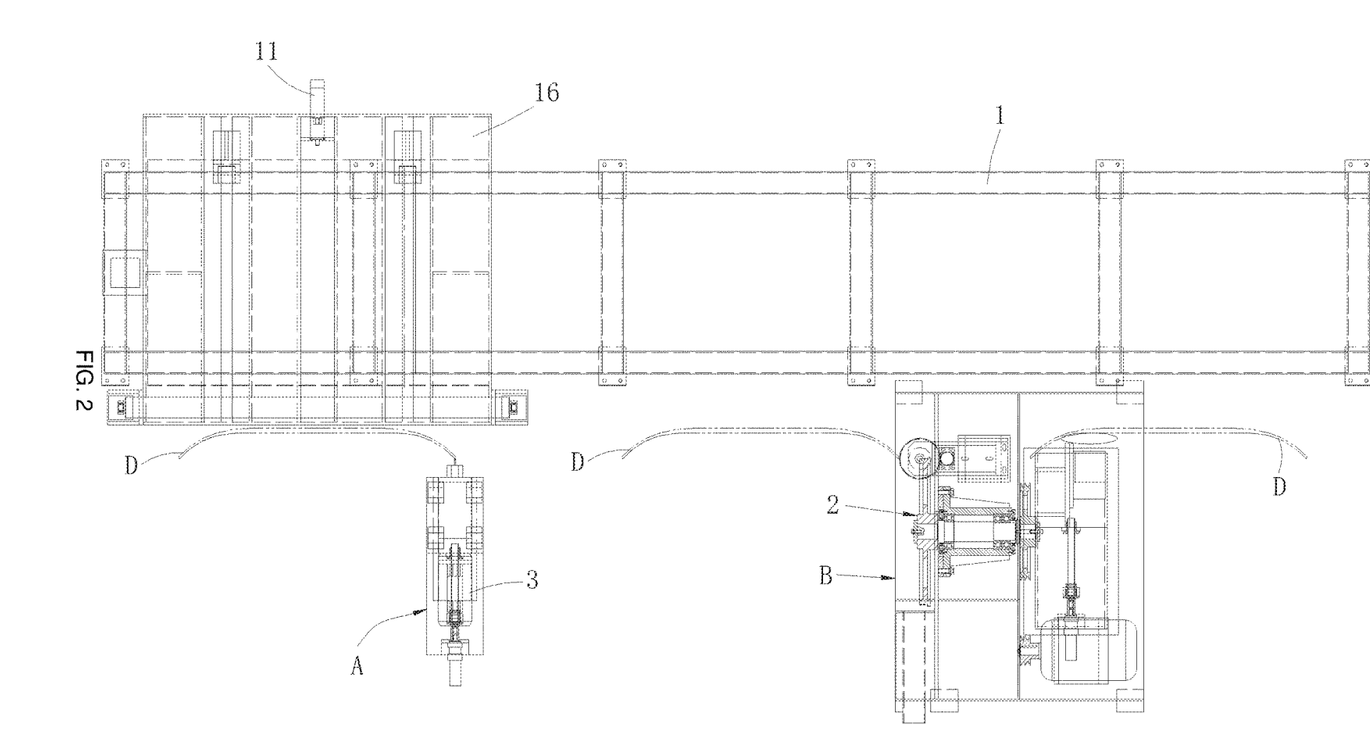
FIG. 2 is a top view (where a workpiece chamfering device is omitted) of FIG. 1.
Figure 3:
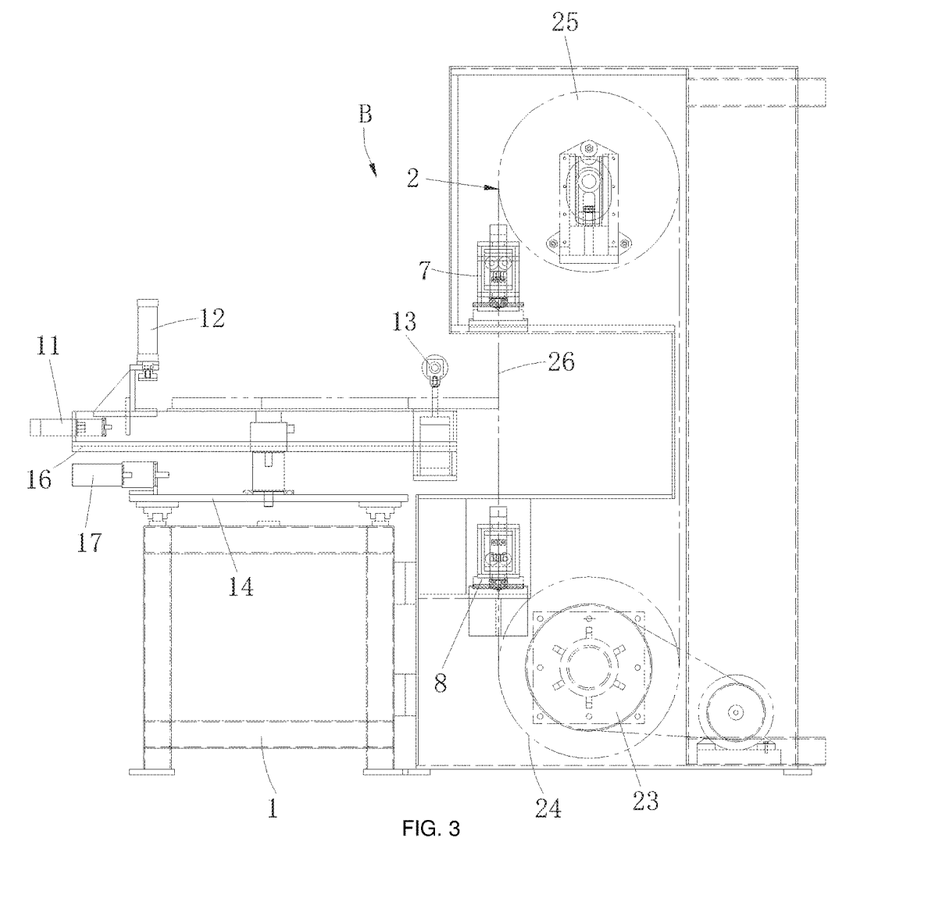
FIG. 3 is a schematic diagram of a sawing station.

Referring to FIGS. 1, 2 and 3 together, in a preferred embodiment of an automatic machining device for a high-speed rail pantograph carbon slide plate and a machining method thereof according to the present invention, the automatic machining device is sequentially provided with a milling station A, a sawing station B and a chamfering station C and comprises a machine frame 1, a band sawing machine 2, a workpiece milling device 3, a workpiece chamfering device 4, a computer numerical control (CNC) system 5 and a pneumatic system 6.

The band sawing machine 2, the workpiece milling device 3 and the workpiece chamfering device 4 are located on the same side of the machine frame 1; the workpiece milling device 3 is arranged in the front of the band sawing machine 2, the workpiece chamfering device 4 is disposed at the rear of the band sawing machine 2, and a carbon slide plate workpiece D to be machined is placed on the machine frame 1 to be sequentially subjected to milling, sawing and chamfering machining. The CNC system 5 and the pneumatic system 6 control the whole sawing band sawing machine to run normally.

The band sawing machine 2 is located on the sawing station B and comprises a saw frame 21, a saw blade tensioning device 22, a main driving system 23, a driving pulley 24, a driven pulley 25 and a band saw blade 26. The band sawing machine 2 is a vertical band sawing machine; the driving pulley 24 and the driven pulley 25 are arranged up and down, and the height of the driving pulley 24 is lower than that of the driven pulley 25.

The saw frame 21 is located on the left side of the machine frame 1. The driving pulley 24 and the driven pulley 25 are arranged on the saw frame 21. The main driving system 23 drives the driving pulley 24 to rotate, the driving pulley 24 drives the band saw blade 26 to rotate along the driving pulley 24 and the outer circle side edge of the driven pulley 25. The tensioning degree of the band saw blade 26 is adjusted through the saw blade tensioning device 22 disposed on the side of the driven pulley 25. The saw frame 21 is further provided with a saw band guiding device, and the saw band guiding device can deflect the angle of the band saw blade 26 and guide the band saw blade 26. The saw band guiding device comprises a saw band upper guide servo rotating device 7 and a saw band lower guide servo rotating device 8. The saw band upper guide servo rotating device 7 and the saw band lower guide servo rotating device 8 are structurally the same.

The saw band upper guide servo rotating device 7 is close to the side of the driven pulley 25, and the saw band lower guide servo rotating device 8 is close to the side of the driving pulley 24. The saw band upper guide servo rotating device 7 and the saw band lower guide servo rotating device 8 can freely, synchronously and correspondingly rotate the band saw blade 26 within a certain range.

Figure 5:
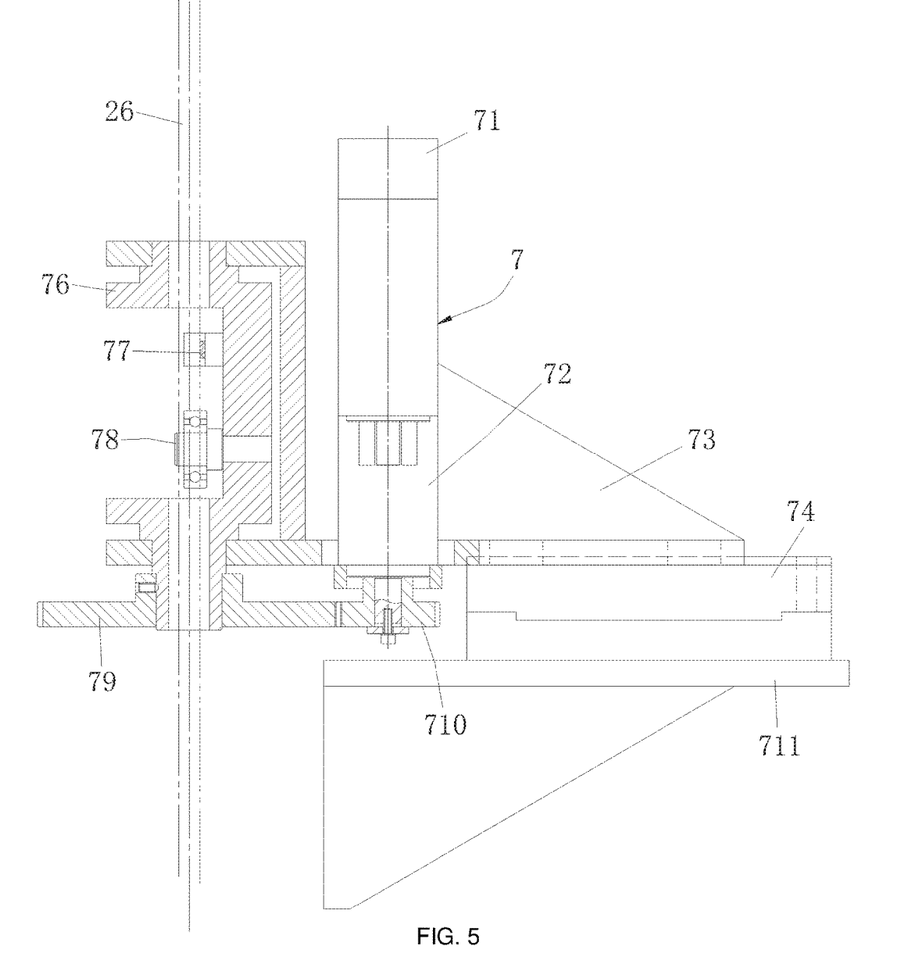
FIG. 5 is a schematic diagram of a saw band upper guide servo rotating device.

Referring to FIGS. 1, 2 and 5 together, the saw band upper guide servo rotating device 7 comprises a servo motor 71, a precision planetary reducer 72, a mounting base 73, a rotating shaft 76, a driven gear 79 and a driving gear 710. The servo motor 71 drives the precision planetary reducer 72; the precision planetary reducer 72 drives the driven gear 79 through the driving gear 710; and the driven gear 79 drives the rotating shaft 76 to rotate on the mounting base 73 according to a designated angle. The axial position of the rotating shaft 76 is provided with a through hole, and the band saw blade 26 penetrates the through hole (namely the axial position of the rotating shaft 76).

The rotating shaft 76 is provided with a saw band guide block 77 and a saw band pre-guiding shaft 78, and the band saw blade 26 is driven by the saw band guide block 77 and the saw band pre-guiding shaft 78 to rotate according to a designated angle. The saw band upper guide servo rotating device 7 and the saw band lower guide servo rotating device 8 which are installed at the two ends of the band saw blade 26 rotate correspondingly synchronously, and freely rotate the angle of the band saw blade 26 within a certain range, so as to adapt to the cambered surface requirements of workpiece curve machining. The band saw blade 26 randomly and freely rotate within a range of −90 degrees to +90 degrees around its symmetric center.

In order to guarantee that the rotating axis of the band saw blade 26 and the rotating axis of the rotating shaft 76 are coaxial, the saw band upper guide servo rotating device 7 further comprises a horizontal adjustment base plate 74 and a support 711. The mounting base 73 is disposed on the horizontal adjustment base plate 74; the left-right horizontal position of the mounting base 73 can be adjusted on the horizontal adjustment base plate 74. The horizontal adjustment base plate 74 is arranged on the support 711, and the front-rear horizontal position of the mounting base 73 can be adjusted on the support 711, and the support 711 is disposed on the saw frame 1.

Referring to FIGS. 1, 2 and 3 together, the machine frame 1 is provided with a workpiece horizontal pushing servo device 11, a workpiece clamping pushing pneumatic device 12, a saw front workpiece pneumatic clamping device 13, a longitudinal servo moving working table 14, a longitudinal servo moving device 15, a horizontal servo moving working table 16 and a horizontal moving servo device 17. The longitudinal servo moving device 15 drives the longitudinal servo moving working table 14 to move horizontally; and the horizontal moving servo device 17 drives the horizontal servo moving working table 16 to move longitudinally. The horizontal moving servo device 17 and the horizontal servo moving working table 16 are disposed on the longitudinal servo moving working table 14; and the workpiece horizontal pushing servo device 11, the workpiece clamping pushing pneumatic device 12 and the saw front workpiece pneumatic clamping device 13 are arranged on the horizontal servo moving working table 16.

Figure 4:
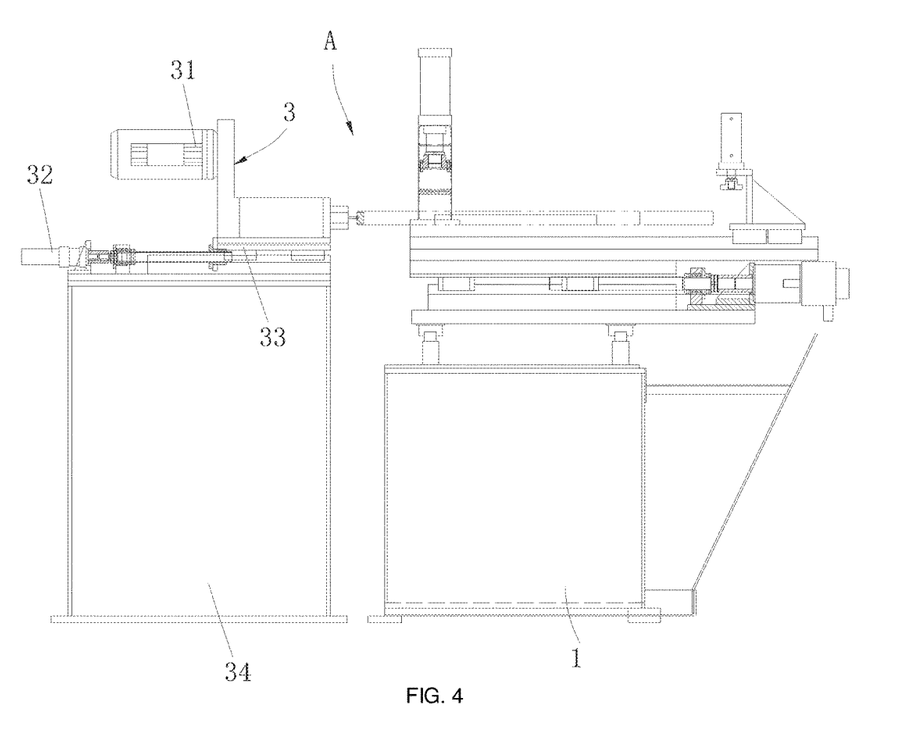
FIG. 4 is a schematic diagram of a milling station.

Referring to FIGS. 2 and 4 together, the workpiece milling device 3 is located on the milling station and comprises a milling head 31, a milling head moving servo motor 32, a milling head moving base 33 and a milling support 34. The milling head moving servo motor 32 and the milling head moving base 33 are arranged on the milling support 34. The milling head 31 is arranged on the milling head moving base 33; and the milling head moving servo motor 32 drives the milling head 31 to move horizontally in a left-right mode through the milling head moving base 33. The milling head 31 can perform milling groove machining on the left side of the carbon slide plate D. The milling support 34 is located on the left side of the machine frame 1.

Figure 6:
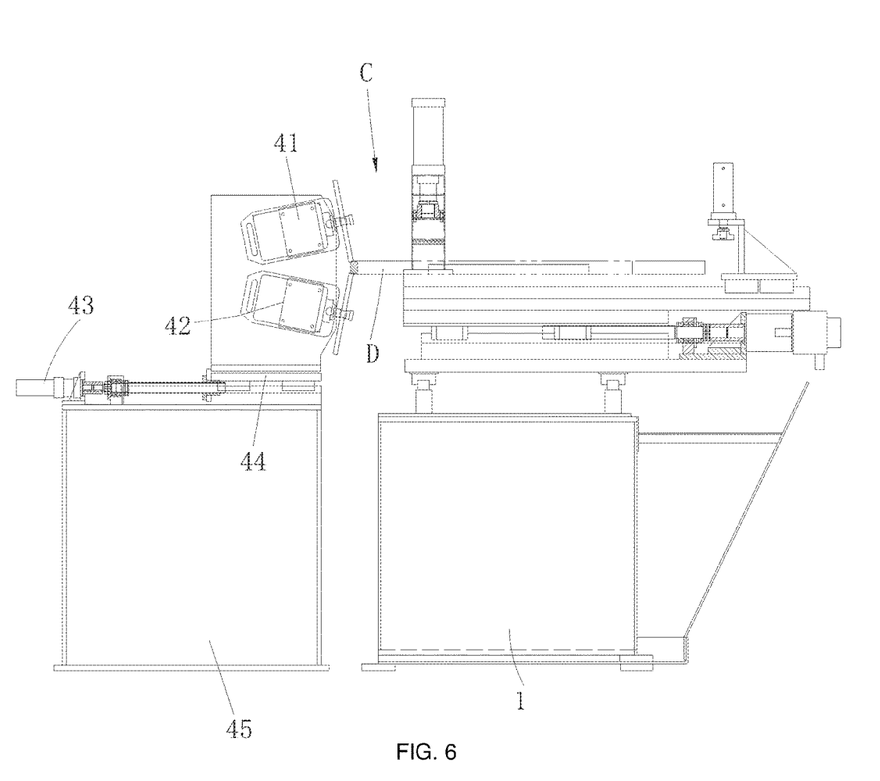
FIG. 6 is a schematic diagram of a chamfering station.

Referring to FIGS. 1 and 6 together, the workpiece chamfering device 4 is located on the chamfering station and comprises an upper chamfering motor 41, a lower chamfering motor 42, a chamfering moving motor 43, a chamfering moving base 44 and a chamfering support 45. The upper chamfering motor 41 and the lower chamfering motor 42 are structurally identical. The chamfering moving motor 43 and the chamfering moving base 44 are arranged on the chamfering support 45; and the chamfering moving motor 43 drives the chamfering moving base 44 to move. The upper chamfering motor 41 and the lower chamfering motor 42 are disposed on the chamfering moving base 44 up and down. The chamfering moving motor 43 drives the upper chamfering motor 41 and the lower chamfering motor 42 to move horizontally in a left-right mode simultaneously through the chamfering moving base 44, and the upper chamfering motor 41 and the lower chamfering motor 42 simultaneously perform chamfering machining on the edge of the left side of the carbon slide plate workpiece D. The chamfering support 45 is located on the left side of the machine frame 1.

The present invention further comprises a using method for performing sawing machining by means of the all CNC curve profiling sawing band sawing machine. A vertical sawing machine is adopted to saw a large carbon block with the dimensions of 850×1300×600 mm and the Shore hardness of 70-85 into sheet blanks with the dimensions of 850×1300×40 mm, and then through groove milling and arc sawing, the small-dimension blanks form high-speed rail pantograph carbon sliding blocks composed of multiple multi-section radians; the carbon sliding blocks are chamfered to be finished products; processes of radian groove milling, arc sawing and arc chamfering and the like of the blanks are combined together to perform sequential machining, and the finished products can be machined from the blanks by one-time clamping. The method comprises the following steps:

the first step: the device is started and is in an initial state; the CNC system 5 and the pneumatic system 6 of the device are started; the longitudinal servo moving working table 14, the horizontal servo moving working table 16 and the workpiece horizontal pushing servo device 11 of the device return to an origin; and the workpiece clamping pushing pneumatic device 12 and the saw front workpiece pneumatic clamping device 13 are loosened;

the second step: the carbon slide plate workpiece D is fed and clamped; a blank of the carbon slide plate workpiece D to be sawed is manually lifted to the horizontal servo moving working table 16, the workpiece clamping pushing pneumatic device 12 clamps the blank, the workpiece horizontal pushing servo device 11 is started to push the blank out to an origin position to be sawed, and the saw front workpiece pneumatic clamping device 13 clamps the blank;

the third step: the milling station works; a CAD drawing of the carbon slide plate workpiece D to be sawed is input into the CNC system 5 to be subjected to program editing; a start button is started, the milling head moving servo motor 32 drives the milling head 31 to move on the milling head moving base 33; the longitudinal servo moving device 13 and the horizontal moving servo device 11 perform interpolation motion according to the input CAD drawing to move to be in place, and the milling head 31 performs milling of a curve groove of the blank of the carbon slide plate workpiece D;

the fourth step: the sawing station works; after the milling is performed, the main driving system 23 runs and drives the band saw blade to run at a high speed through the saw blade tensioning device 22, and then the longitudinal servo moving device 15 and the horizontal moving servo device 17 move simultaneously according to the editing program of the input CAD drawing, so that the longitudinal and horizontal servo interpolation motion of the workpiece is performed; meanwhile, under the precision driving by the saw band upper guide servo rotating device 7 and the saw band lower guide servo rotating device 8, the band saw blade 26 rotates around the center of the band saw blade, so that the band saw blade is always tangent to a sawing arc, and it is guaranteed that a sawing curve is connected smoothly;

the fifth step: the chamfering station works; after the sawing, the longitudinal servo moving working table 10 continues to move forwards; when the longitudinal servo moving working table reaches the position of the workpiece chamfering device 4, the device sends signals to the CNC system 5; driven by the chamfering moving motor 43, the upper chamfering motor 41 and the lower chamfering motor 42 move forwards along the chamfering moving base 44 and rotates; at the same time, the longitudinal servo moving device 13 and the horizontal moving servo device 11 perform interpolation motion according to the input CAD drawing to move to be in place, so as to complete chamfering processes of the edges of the upper surface and the lower surface of the carbon slide plate workpiece D;

the sixth step: discharging is performed after the sawing is performed; after one carbon slide plate workpiece D is sawed, the longitudinal servo moving working table 14 and the horizontal servo moving working table 16 return to the origin, the saw front workpiece pneumatic clamping device (5) loosens the carbon slide plate workpiece D, the carbon slide plate workpiece D having been machined is taken out to prepare for the machining of a next blank; and circulation is performed in this way until the last workpiece is machined.

In the fifth step, the chamfering machining angle of the carbon slide plate workpiece D is set by respectively adjusting the angle between the carbon slide plate workpiece D and the upper chamfering motor 41 and the angle between the carbon slide plate workpiece D and the lower chamfering motor 42.

The above described is only preferred embodiments of the present invention and is not intended to limit the present invention. Any modification, equivalent replacement and improvement and the like within the spirit and principle of the present invention shall be included in the protective scope of the present invention.

EMBODIMENTS OF THE PRESENT INVENTION

Execution Modes of the Present Invention

Description paragraphs of the embodiments of the present invention are typed in at this position.

INDUSTRIAL APPLICABILITY

Description paragraphs of the industrial applicability are typed in at this position.

FREE CONTENT OF SEQUENCE TABLE

Description paragraphs of the free content of a sequence table are typed in at this position.

What is claimed is:

1. An automatic machining device for a high-speed rail pantograph carbon slide plate,
    wherein the automatic machining device is sequentially provided with a milling station, a sawing station and a chamfering station and comprises a machine frame, a band sawing machine, a workpiece milling device, a workpiece chamfering device, a computer numerical control (CNC) system and a pneumatic system;
    wherein the band sawing machine, the workpiece milling device and the workpiece chamfering device are located on the same side of the machine frame;
    wherein the workpiece milling device is configured to be arranged in the front of the band sawing machine;
    wherein the workpiece chamfering device is configured to be disposed at the rear of the band sawing machine, and
    wherein a carbon slide plate workpiece to be machined is configured to be placed on the machine frame to be sequentially subjected to milling, sawing and chamfering machining;
    wherein the CNC system and the pneumatic system are configured to control the whole sawing band sawing machine to run normally;
    wherein the band sawing machine is located on the sawing station and comprises a saw frame, a saw blade tensioning device, a main driving system, a driving pulley, a driven pulley and a band saw blade;
    wherein the saw frame is located on a left side of the machine frame;
    wherein the driving pulley and the driven pulley are arranged on the saw frame;
    wherein the main driving system is configured to drive the driving pulley to rotate, and the driving pulley is configured to drive the band saw blade to rotate along the driving pulley and the outer circle side edge of the driven pulley;
    wherein the tensioning degree of the band saw blade is adjusted through the saw blade tensioning device disposed on the side of the driven pulley;
    wherein the saw frame is further provided with a saw band guiding device; the saw band guiding device comprises a saw band upper guide servo rotating device and a saw band lower guide servo rotating device;
    wherein the saw band upper guide servo rotating device is close to the side of the driven pulley, and the saw band lower guide servo rotating device is close to the side of the driving pulley; and
    wherein the saw band upper guide servo rotating device and the saw band lower guide servo rotating device can freely, synchronously and correspondingly rotate the band saw blade within a certain range.

2. The automatic machining device for the high-speed rail pantograph carbon slide plate according to claim 1,
    wherein the saw band upper guide servo rotating device and the saw band lower guide servo rotating device are structurally the same.

3. The automatic machining device for the high-speed rail pantograph carbon slide plate according to claim 2,
    wherein the saw band upper guide servo rotating device comprises a servo motor, a precision planetary reducer, a mounting base, a rotating shaft, a driven gear and a driving gear;
    wherein the servo motor is configured to drive the precision planetary reducer;
    wherein the precision planetary reducer is configured to drive the driven gear through the driving gear;
    wherein the driven gear is configured to drive the rotating shaft to rotate on the mounting base according to a designated angle;
    wherein the band saw blade penetrates an axis of the rotating shaft;
    wherein the rotating shaft is provided with a saw band guide block and a saw band pre-guiding shaft, and the band saw blade is configured to be driven by the saw band guide block and the saw band pre-guiding shaft to rotate according to a designated angle.

4. The automatic machining device for the high-speed rail pantograph carbon slide plate according to claim 3,
wherein the saw band upper guide servo rotating device further comprises a horizontal adjustment base plate and a support;
wherein the mounting base is disposed on the horizontal adjustment base plate;
wherein a left-right horizontal position of the mounting base is adjustable on the horizontal adjustment base plate;
wherein the horizontal adjustment base plate is arranged on the support;
wherein the front-rear horizontal position of the mounting base is adjustable on the support, and
wherein the support is disposed on the saw frame.

5. The automatic machining device for the high-speed rail pantograph carbon slide plate according to claim 1,
wherein the band saw blade is configured to randomly and freely rotate within a range of −90 degrees to +90 degrees around its symmetric center.

6. The automatic machining device for the high-speed rail pantograph carbon slide plate according to claim 1,
wherein the machine frame is provided with a workpiece horizontal pushing servo device, a workpiece clamping pushing pneumatic device, a saw front workpiece pneumatic clamping device, a longitudinal servo moving working table, a longitudinal servo moving device, a horizontal servo moving working table and a horizontal moving servo device;
wherein the longitudinal servo moving device is configured to drive the longitudinal servo moving working table to move horizontally;
wherein the horizontal moving servo device is configured to drive the horizontal servo moving working table to move longitudinally;
wherein the horizontal moving servo device and the horizontal servo moving working table are disposed on the longitudinal servo moving working table; and
wherein the workpiece horizontal pushing servo device, the workpiece clamping pushing pneumatic device and the saw front workpiece pneumatic clamping device are arranged on the horizontal servo moving working table.

7. The automatic machining device for the high-speed rail pantograph carbon slide plate according to claim 6,
wherein the workpiece milling device is located on the milling station and comprises a milling head, a milling head moving servo motor, a milling head moving base and a milling support;
wherein the milling head moving servo motor and the milling head moving base are arranged on the milling support;
wherein the milling head is arranged on the milling head moving base;
wherein the milling head moving servo motor is configured to drive the milling head to move horizontally in a left-right mode through the milling head moving base;
wherein the milling head is configured to perform milling groove machining on a left side of the carbon slide plate; and
wherein the milling support is located on a left side of the machine frame.

8. The automatic machining device for the high-speed rail pantograph carbon slide plate according to claim 7,
wherein the workpiece chamfering device is located on the chamfering station and comprises an upper chamfering motor, a lower chamfering motor, a chamfering moving motor, a chamfering moving base and a chamfering support;
wherein the chamfering moving motor and the chamfering moving base are arranged on the chamfering support;
wherein the chamfering moving motor drives the chamfering moving base to move;
wherein the upper chamfering motor and the lower chamfering motor are disposed on the chamfering moving base up and down;
wherein the chamfering moving motor drives the upper chamfering motor and the lower chamfering motor to move horizontally in a left-right mode simultaneously through the chamfering moving base;
wherein the upper chamfering motor and the lower chamfering motor simultaneously perform chamfering machining on the edge of a left side of the carbon slide plate workpiece; and
wherein the chamfering support is located on the left side of the machine frame.

9. A method for machining by the automatic machining device for the high-speed rail pantograph carbon slide plate according to claim 8, wherein the method comprises the following steps:
the first step: starting the device in an initial state;
starting the CNC system and the pneumatic system of the device;
returning the longitudinal servo moving working table, the horizontal servo moving working table and the workpiece horizontal pushing servo device of the device an origin; and
loosening the workpiece clamping pushing pneumatic device and the saw front workpiece pneumatic clamping device;
the second step: feeding and clamping the carbon slide plate workpiece;
manually lifting a blank of the carbon slide plate workpiece to be sawed to the horizontal servo moving working table, the workpiece clamping pushing pneumatic device clamps the blank,
starting the workpiece horizontal pushing servo device to push the blank out to an origin position to be sawed, and
clamping the blank with the saw front workpiece pneumatic clamping device;
the third step: working the milling station;
subjecting a CAD drawing of the carbon slide plate workpiece to be sawed is input into the CNC system to program editing;
starting a start button, driving the milling head to move on the milling head moving base with the milling head moving servo motor;
performing interpolation motion according to the input CAD drawing by the longitudinal servo moving device and the horizontal moving servo device to move to be in place, and performing milling of a curve groove of the blank of the carbon slide plate workpiece with the milling head;
the fourth step: working the sawing station;
performing longitudinal and horizontal servo interpolation motion of the workpiece after the milling by running the main driving system and driving the band saw blade to run at a high speed through the saw blade tensioning device, and then moving the longitudinal servo moving device and the horizontal moving servo device simultaneously according to the editing program of the input CAD drawing;

wherein guaranteeing that a sawing curve is connecting smoothly under precision driving by the saw band upper guide servo rotating device and the saw band lower guide servo rotating device, rotating the band saw blade around a center of the band saw blade, so that the band saw blade is always tangent to a sawing arc;

the fifth step: working the chamfering station;

after the sawing, continuing moving the longitudinal servo moving working table forwards;

when the longitudinal servo moving working table reaches the position of the workpiece chamfering device, sending signals to the CNC system with the device;

driven by the chamfering moving motor, moving and rotating the upper chamfering motor and the lower chamfering motor forwards along the chamfering moving base;

at the same time, performing interpolation motion according to the input CAD drawing with the longitudinal servo moving device and the horizontal moving servo device to move to be in place, so as to complete chamfering processes of the edges of the upper surface and the lower surface of the carbon slide plate workpiece;

the sixth step: performing discharging after the sawing is performed;

after one carbon slide plate workpiece is sawed, returning the longitudinal servo moving working table and the horizontal servo moving working table to the origin, loosening the carbon slide plate workpiece on the saw front workpiece pneumatic clamping device, so as to prepare for the machining of a next blank; and performing circulation in this way until the last workpiece is machined.

10. The method for machining by the automatic machining device for the high-speed rail pantograph carbon slide plate according to claim 9, wherein in the fifth step, the chamfering machining angle of the carbon slide plate workpiece is set by respectively adjusting the angle between the carbon slide plate workpiece and the upper chamfering motor and the angle between the carbon slide plate workpiece and the lower chamfering motor.

* * * * *